United States Patent [19]

Falkmann et al.

[11] Patent Number: 4,866,980
[45] Date of Patent: Sep. 19, 1989

[54] RATE BIASED SIGNAL NOISE CLIPPER

[75] Inventors: Ronald A. Falkmann, Palm Beach Gardens; Adelard Levesque, Jr., Jupiter, both of Fla.

[73] Assignee: United Technologies Corporation, Hartford, Conn.

[21] Appl. No.: 289,878

[22] Filed: Dec. 27, 1988

[51] Int. Cl.$^4$ .......................................... G01M 15/00
[52] U.S. Cl. .................................. 73/117.3; 374/144; 374/169
[58] Field of Search ............... 73/117.3; 374/144, 169, 374/172; 364/557; 123/464

[56] References Cited

U.S. PATENT DOCUMENTS 4,588,954  5/1986  Seymour .......................... 374/144 X
4,672,566  6/1987  Asano et al. ..................... 374/144 X Primary Examiner—Jerry W. Myracle
Attorney, Agent, or Firm—Norman Friedland

[57] ABSTRACT

The software for the electronic engine control system for a gas turbine engine responding to a temperature sensor measuring the gas path temperature at the inlet of the engine is modified to include means for preventing the control system from overreacting to excessive signal noise. The lead time constant is multiplied by a rate bias factor that may modified as a function of aircraft and/or engine operation conditions to reduce the lead compensation solely when the noise level goes beyond a predetermined threshold.

6 Claims, 1 Drawing Sheet

RATE BIASED SIGNAL NOISE CLIPPER

The invention was made under a U.S. Government contract and the Government has rights herein.

DESCRIPTION

1. Technical Field

This invention relates to sensors and particularly to noise compensation means for a temperature sensor for enhancing the accuracy of the signal being sensed.

2. Background Art

As is well known, the aircraft industry is expending significant efforts in increasing the flight speed and performance of aircraft which is particularly true with military types of aircraft. It generally follows that to achieve higher aircraft speeds, the demands on the airframe's propulsive system is increased, thus requiring increases in the rotor's RPM, air flows and the like. Unfortunately, accompanying these increases are noises that tend to interfere with the accuracy of sensors used on these aircraft.

In heretofore known controls that employ digital types of electronic computers to assure the accuracy necessary to effectuate the control function it has been customary to add lead compensation to compensate for the time lag response accompanying the measured parameter.

The temperature sensors that measure the temperature of the gas path in the inlet of the power plant, to which the invention pertains, are thermocouples encased in a protective sheath. The output of the thermocouples, which are typically of the bi-metal construction, is relayed to a digital computer that together with other sensed parameters control the operation of the power plant. In heretofore known controls designed for this purpose, so as to compensate the signal generated by these thermocouples to offset the effects of thermal lags, lead compensation is added to the computer software. Hence, the final signal employed by the control generally will have been filtered and have added thereto the lead compensation to compensate for the lag inherent in the thermocouples response time.

However, as mentioned above, the treatment heretofore employed to protect against the noise levels are not adequate for these advanced engines. As a matter of fact, it has been found that not only does the lead compensation fail to handle the excessive signal noises accompanying these advanced engines, but it also has a tendency to amplify the noise even further which impairs the accuracy of the sensed signal to the point where the signal is unacceptable for controlling aircraft engine operation.

We have found that we can obviate the above noted problems so as to prevent the control from overreacting to excessive noise. To this end, a system responding to the noise level permits the normal lead compensation to adjust the sensed signal in the presence of a predetermined low noise level and biases the compensation when a certain noise threshold is exceeded. Hence, the rate bias factor is reduced between 1 and 0 proportionally with the magnitude of the noise spike evidenced in the excessive noise threshold to cut back on the amount of lead compensation.

SUMMARY OF THE INVENTION

An object of this invention is to provide means to improve the accuracy of a sensed signal subjected to unwanted noise.

A feature of this invention is to provide means to compensate for noise levels above a given threshold for a temperature sensor that has lead compensation by modifying the value of compensation as a function of the noise levels.

Another feature of this invention is to bias the lead compensation of a computed temperature sensed signal as a function of aircraft flight conditions.

BEST MODE FOR CARRYING OUT THE INVENTION

The invention in the preferred embodiment is utilized with a full authority electronic digital fuel control, as for example, the fuel control Model No. EEC-104 manufactured by the Hamilton Standard Division of United Technologies Corporation used on the PW 2000 engine models or the digital fuel control for the F-100 engine manufactured by Pratt and Whitney of United Technologies Corporation, the assignee common to this patent application.

Suffice it to say that these engines noted above are of the twin-spool axial flow turbo fan type and the engine control serves to meter fuel to the engine and vary engine geometry to achieve power scheduling automatically in response to the operator's power setting. However, the invention, as will be appreciated by those skilled in the art has utilization for other types of engines and other applications where excessive noise is a problem.

Figure 1:
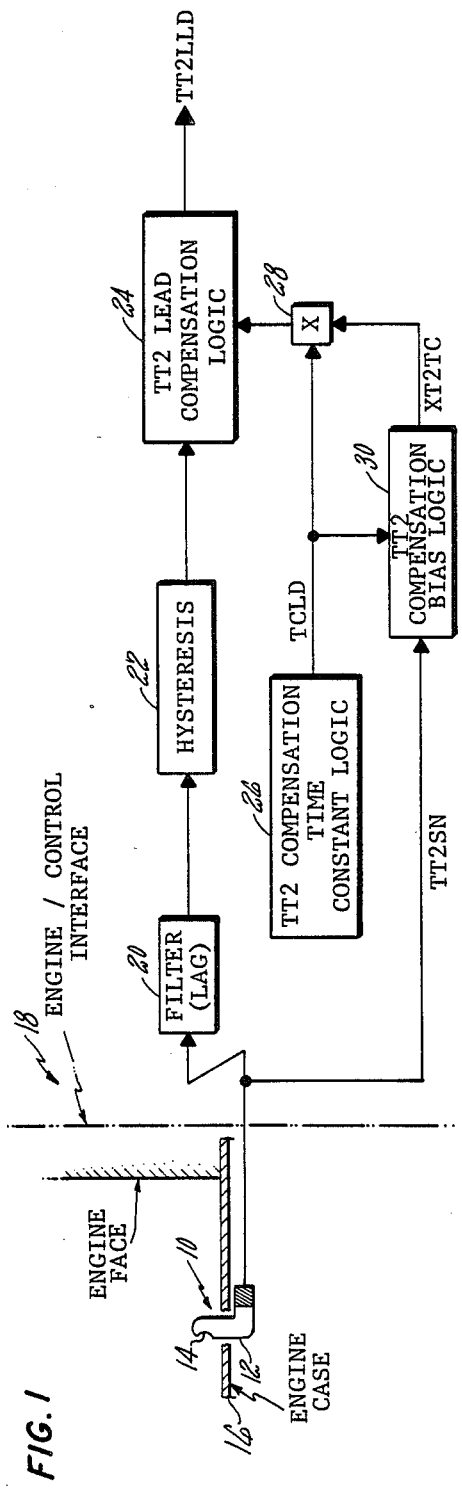
FIG. 1 is a schematic and block diagram of a compensated temperature signal biased in accordance with this invention.

The lead compensation which has heretofore been employed is illustrated in FIG. 1 and will be described herein below. The typical thermocouple for measuring gas path temperature generally indicated by reference numeral 10 includes a sheath 12 surrounding its sensing elements of the thermocouple 10. The sheath 12 having an opening 14 facing the flow of the gas path is suitably mounted to the engine inlet case 16 which is generally represented by reference numeral 18.

The signal generated by thermocouple 10 is relayed to the computer where it is first filtered by a suitable filter 20 and adjusted for the hysteresis 22 to remove low amplitude noise. The lead compensation is then added in a well-known manner represented by the block 24 so as to compensate for the inherent lag in the time response of the actual engine inlet total temperature signal (TT2) generated by thermocouple 10. This output signal is the lead lag value (TT2LLD).

According to the invention, the output of the TT2 compensation time constant logic (TCLD) generated in box 26 is multiplied at the multiplier 28 by the TT2 compensation bias logic (XT2TC) represented by the box 30 to be described hereinbelow. Since the value of XT2TC equals (1) one during normal operation, i.e., when the noise level is below a given threshold, the full amount of lead compensation is permitted. Whenever the value exceeds the noise threshold, XT2TC is reduced to some value between (0) zero and (1) one to cutback on the amount of lead compensation. For high noise levels, the bias value is made proportional to the noise spike.

Figure 2:
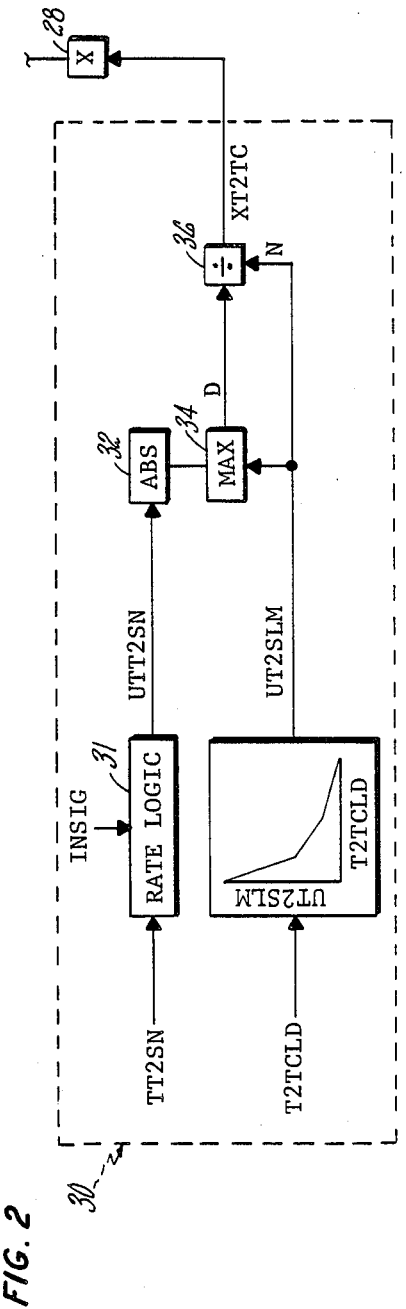
FIG. 2 is a block diagram of the biasing signal utilized in FIG. 1.

As noted in FIG. 2, the sensed total temperature signal (TT2SN) is fed to a logic network 31 that generates a signal indicative of the actual rate of the temperature being sensed (UTT2SN). This signal is converted to an absolute value by the circuitry in box 32 which is the input of the maximum value select represented by box 34. The maximum select selects between the absolute value of the rate logic and the calculated threshold rate (UT2SLM). The calculated threshold rate level is the highest TT2 rate that the thermocouple is capable of measuring at the given flight condition. TT2 rates above this level are presumed to be caused by high level noise. The UT2SLM threshold signal is generated by the computer as a function of aircraft or engine operating variable(s) such as altitude or rotor speed and the like and this signal becomes the numerator value in the divider 36 where it is divided by the output of the maximum selector 34. When the actual rate of UTT2SN is equal to or less than the threshold rate of UT2SLM, then XT2TC will equal (1) one (normal noise level). When the value of UTT2SN is greater than UT2SLM, this signal will be the input signal to the divider where the dividend UT2SLM equals some value between (0) zero and (1) one (excessive noise level). Obviously, the biasing signal, which biases the lead compensation signal generated in box 24, will serve to prevent the engine/control system from overreacting to excessive TT2 signal noise.

Although this invention has been shown and described with respect to detailed embodiments thereof, it will be understood by those skilled in the art that various changes in form and detail thereof may be made without departing from the spirit and scope of the claimed invention.

We claim:

1. For a computerized control for controlling a gas turbine engine having a temperature sensor for measuring the temperature of said engine, said computerized control being responsive to a temperature signal from said temperature sensor, lead compensation means in said computerized control for compensating for the lag in time responsiveness inherent in said temperature sensor, means responsive to the level of noise associated with said temperature sensor for generating a signal to bias said lead compensating means whereby said lead compensation means is reduced to provide less lead compensation to said computerized control when said noise level is above a predetermined value.

2. For a computerized control as in claim 1 wherein said temperature sensor is a thermocouple.

3. For a computerized control as in claim 2 wherein said noise responsive means includes a rate producing means responsive to said thermocouple, function generator means responsive to a time constant of said temperature signal for producing a signal indicative of the threshold value of the rate of said temperature signal, maximum select means for comparing said threshold value and the actual rate of said temperature signal for selecting the higher value thereof for producing a maximum value signal, dividing means for dividing said maximized value signal by said threshold value signal for producing a signal indicative of said threshold value, and multiplying means for multiplying said threshold value signal by said time constant for biasing said lead compensation means.

4. For a computerized control as in claim 3 including means for biasing said function generator as a function of aircraft and/or engine operating parameters.

5. For a computerized control as in claim 4 wherein said operating parameter is altitude.

6. For a computerized control as in claim 4 wherein said operation parameter is rotor speed.

* * * * *

UNITED STATES PATENT AND TRADEMARK OFFICE
CERTIFICATE OF CORRECTION

PATENT NO. : 4,866,980
DATED : September 19, 1989
INVENTOR(S) : Ronald A. Falkmann and Adelard Levesque, Jr.

It is certified that error appears in the above-identified patent and that said Letters Patent is hereby corrected as shown below:

On the title page:

Element (57), line 4: after "include" delete "means" and insert --elements--

Signed and Sealed this

Twentieth Day of November, 1990

Attest:

HARRY F. MANBECK, JR.

*Attesting Officer*    *Commissioner of Patents and Trademarks*